United States Patent [19]

Crabbe, Jr.

[11] Patent Number: 4,637,012
[45] Date of Patent: Jan. 13, 1987

[54] FLEXIBLE DUPLEX DUAL PORT SERIAL LINK CONTROLLER

[75] Inventor: Edwin P. Crabbe, Jr., Peoria, Ariz.

[73] Assignee: GTE Communication Systems Corporation, Phoenix, Ariz.

[21] Appl. No.: 812,553

[22] Filed: Dec. 23, 1985

[51] Int. Cl.[4] ..................... H04Q 11/04; G06F 11/20
[52] U.S. Cl. ................................. 370/24; 340/825.16; 375/7; 375/38; 371/8
[58] Field of Search ....................... 361/392, 397, 398; 371/7, 8, 11; 370/24; 375/7, 8, 38, 40; 340/825.06, 825.16; 179/2 DP

[56] References Cited

U.S. PATENT DOCUMENTS

| 4,101,733 | 7/1978 | Whitaker | 370/24 |
| 4,477,895 | 10/1984 | Casper et al. | 371/8 |
| 4,527,157 | 7/1985 | Krikor | 340/825 |
| 4,534,027 | 8/1985 | Perry | 371/8 |

Primary Examiner—Benedict V. Safourek
Assistant Examiner—Frank M. Scutch, III
Attorney, Agent, or Firm—Frank J. Bogacz; Peter Xiarhos

[57] ABSTRACT

A multiple port serial link controller printed wiring card is shown. This printed wiring card provides at least two independent ports. These ports may be of different types such as RS-232 interface, RS-499 interface or other serial protocols such as HDLC, SDLC or BI-SYNC. These printed wiring cards may be combined in a duplex fashion to form two duplex (highly reliable) port transmission circuits. The duplex configuration requires a minimum amount of backplane wiring. This backplane wiring is permanent and requires no manual intervention for switching between transmission and mode types. Switching between transmission mode type and reconfiguring for the occurrence of faults may be accomplished by an automatic processor manipulation of a number of control points.

23 Claims, 4 Drawing Figures

FLEXIBLE DUPLEX DUAL PORT SERIAL LINK CONTROLLER

CROSS-REFERENCE TO RELATED APPLICATIONS

The present application is related to co-pending U.S. Patent Application Ser. No. 812,552, having the same inventive entity and being assigned to the same assignee as the present U.S. Patent Application.

BACKGROUND OF THE INVENTION

The present invention pertains to highly reliable data transmission and more particularly to flexible, minimal circuitry for duplex multiple port data transmission.

Data processing and transmission systems must communicate with other remotely located data processing systems. These data processing systems may communicate via a variety of data transmission types. These types include RS-232 applications (bipolar, 25 pin interfaces) or RS-449 applications (differential, 37 pin interfaces). Traditionally, each such interface circuit is mounted on a separate printed wiring card. As a result, one printed wiring card is required for each interface circuit type. For highly reliable circuit applications, duplication of these printed wiring cards is an expensive scheme which achieves duplex operation. This scheme is wasteful of space and components since one printed wiring card must be used for each copy of the transmission interface circuit.

In addition to the large number of printed wiring cards required to develop a highly reliable multiport data transmission system, such designs are inflexible in that connectors must be changed from one printed wiring card to another and back plane wiring must be added or removed as required. Providing these cabling changes and back plane wiring changes requires a sizable manual effort and such changes are subject to human error.

Accordingly, it is an object of the present invention to provide a highly reliable multiple port serial link controller with a minimum of printed wiring cards or manual intervention required to switch between transmission types.

SUMMARY OF THE INVENTION

In a data transmission system, a multiple port serial link controller is connected to two copies of transmission equipment. The serial link controller includes two printed wiring cards.

Each printed wiring card has a link interface, a switching arrangement, a processor, a controller and a duplex controller. Each link interface is connected to one corresponding copy of the transmission equipment. The link interface transmits and receives different types of serial data between the transmission equipment and the serial link controller.

Each switching arrangement is connected to its corresponding link interface. The switching arrangement selectively controls the transmission and reception of the serial data between the link interface and the serial link controller.

Each controller is connected to its corresponding switching arrangement and each controller operates to transmit and receive serial data from its corresponding switching arrangement and to convert the serial data to parallel data. Each processor is connected to its corresponding controller and operates to receive, to transmit and to store the parallel data. Each duplex controller is connected to its corresponding processor. Each duplex controller is also operated to receive parallel data.

The serial link controller also includes first and second straps. The first strap is connected between the switching arrangements of the first and second printed wiring cards. The first strap transmits serial data from the switching arrangement of the first printed wiring card through the switching arrangement of the second printed wiring card to the duplex controller of that second printed wiring card. In response, the duplex controller of the second printed wiring card converts the data from serial to parallel and transmits the parallel data to its associated processor.

The second strap is also connected between the switching arrangements of the two printed wiring cards. The second strap transmits data from the controller of the second printed wiring card to the first printed wiring card via the two switching arrangements to the duplex controller of the first printed wiring card. Similarly, this duplex controller converts the serial data to parallel transmits and transmits the parallel data to its associated processor.

For a fault in one of the controllers, a third strap connects the duplex controller of the faulty printed wiring card with two active controllers of the other printed wiring card. This third strap transmits serial data from the active duplex controller directly to the switching arrangement of the other printed wiring card. The duplex controller of the second printed wiring card converts the parallel data to serial form and transmits this data directly to the switching arrangement of the first printed wiring card. Then, this data is transmitted directly to the transmission equipment.

A BRIEF DESCRIPTION OF THE DRAWINGS

Figure 4:
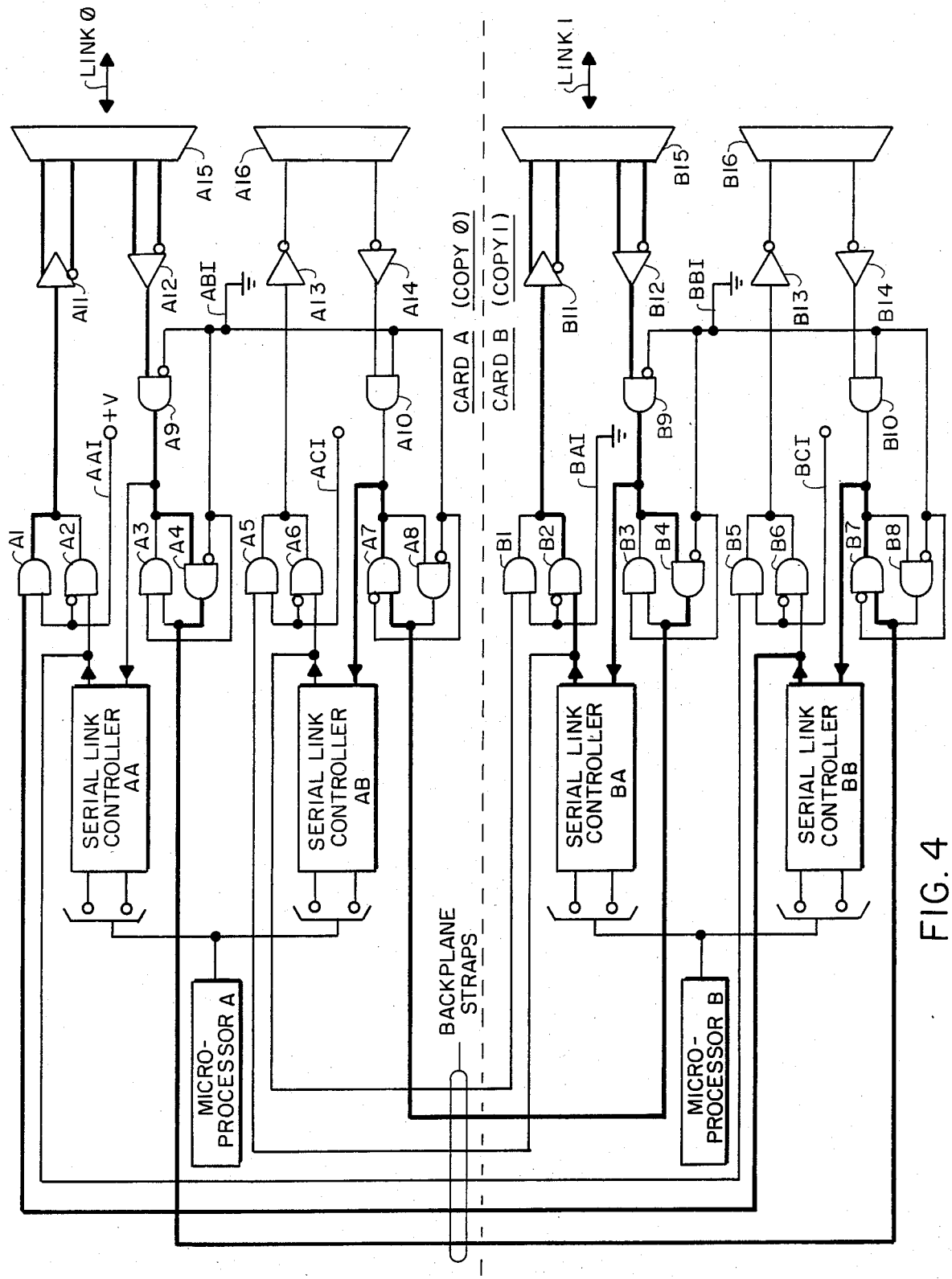

FIG. 4. is a schematic diagram of duplex dual ported serial link controller cards reconfigured for fault detection.

DESCRIPTION OF THE PREFERRED EMBODIMENT

Figure 1:
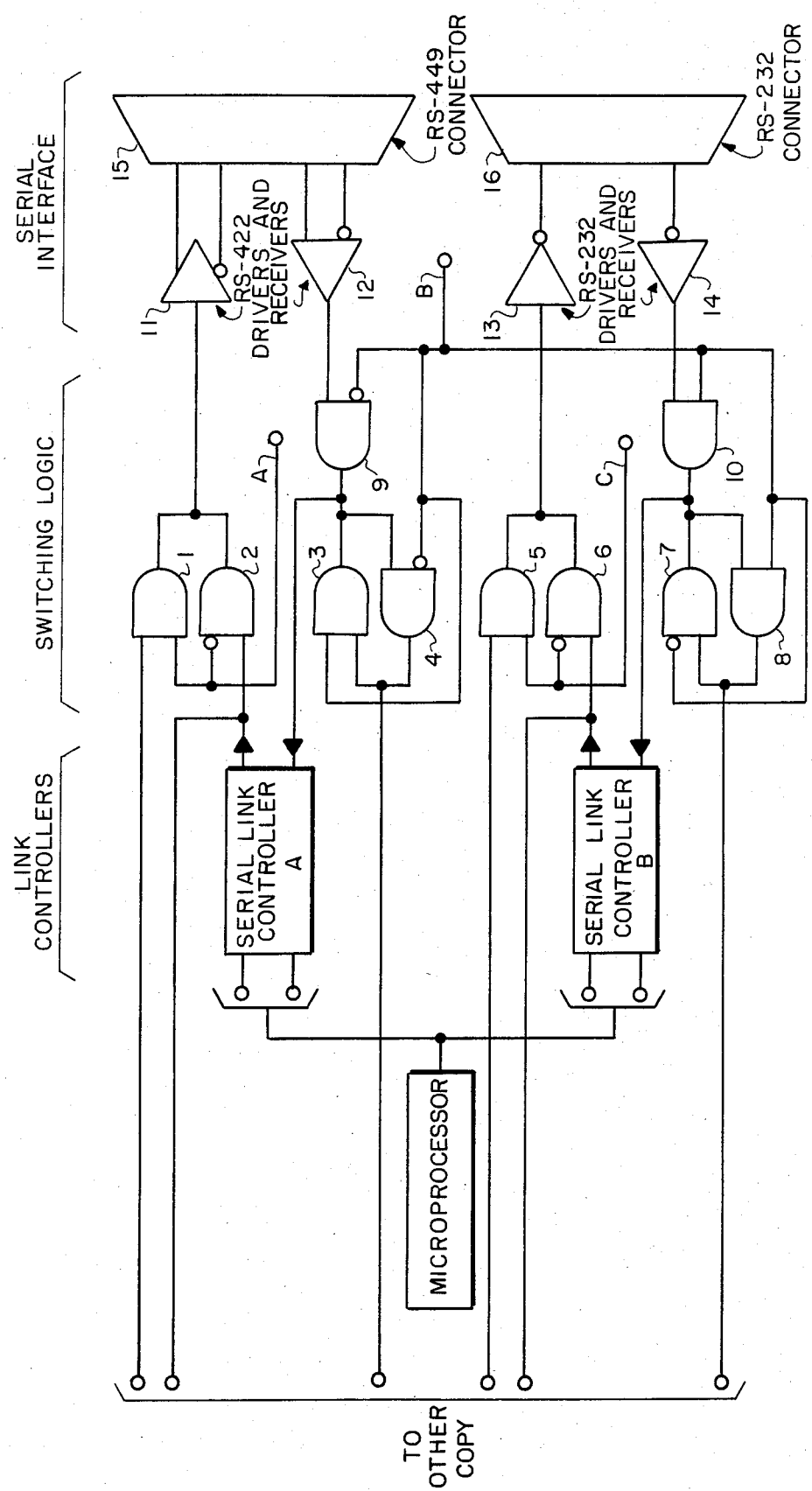
FIG. 1 is a schematic diagram of a dual ported serial link controller printed wiring card.

Printed wiring cards which contain several types of serial link controllers on one physical printed wiring card are particularly useful in high reliability redundant transmission circuitry. One such printed wiring card is shown in FIG. 1. This printed wiring card includes four logical sections. First, a microprocessor stores data and controls each of the serial link controllers. The serial link controller section, as shown in FIG. 1, may consist of as many serial link controllers as may be packaged on one physical printed wiring card. Each of the serial link controllers operates to convert between serial and parallel data. Serial data is transmitted outward from each serial link controller and received as input to each link controller from other transmission equipment (not shown). Each of the serial link controllers transmits parallel data to the microprocessor.

The next section of the printed wiring card is the switching logic. This switching logic includes all the gates (1 through 10) shown in FIG. 1. This switching logic is equipped with three control points A, B and C. These control points serve to manipulate and route the incoming and out going data to form two duplex ports with the application of a second physical printed wiring card. The control points A, B and C will be connected to a source of +5 volts as a logic 1, to ground as a logic 0 or left unconnected in order to achieve various circuit configurations. These control points may be connected to logic 1 or 0 under software control or manually via hardware straps.

The last portion of the multiple port serial link controller card is the serial interface. The serial interface consists of drivers and receivers for each type of interface to transmission equipment and a connector for each interface. Each connector is connected to a particular transmission medium, such as a modem.

In FIG. 1, two serial interface types are shown; first, an RS-449 interface consisting of RS-422 drivers and receivers 11 and 12 and an RS-449 connector 15; and second, an RS-232 interface including RS-232 drivers and receivers 13 and 14 and an RS-232 connector 16. Each of printed wiring cards in this application will consist of dual port serial link controllers on one printed wiring card. However, with the development of very large scale integration techniques, more than two types of serial links may be placed upon one physical printed wiring card, according to the principles taught herein. A number of connections to the other copy of the duplex serial link controller card are shown at the left of FIG. 1. The serial link controller may also include multi-protocol devices used with HDLC, SDLC, BI-SYNC or other serial protocols.

Each of the succeeding figures in this application will depict the interconnection of two printed wiring cards as shown in FIG. 1. The two printed wiring cards will be designated as card A and card B and correspondingly as copy 0 and copy 1. Each of the cards A and B, shown in the succeeding figures, are as depicted in FIG. 1. That is, each printed wiring card includes a control microprocessor, two serial link controllers (A and B), switching logic and two corresponding serial interfaces. The control points of each printed wiring card (A, B and C) will be depicted in the succeeding figures as XAI, XBI and XCI respectively, where X equal either A or B corresponding to copy 0 or copy 1. Similarly, the leading letter designation of each device will indicate the copy to which that device pertains (card A is copy 0 and card B is copy 1). All other numbering of the succeeding figures corresponds to the devices as shown in FIG. 1.

Referring again to FIG. 1, incoming data from a RS-449 (differential) transmitter is passed through connector 15 (which is a 37 pin connector), through receiver 12, through AND gate 9, to serial link controller A. The data is converted from serial form to parallel by serial link controller A and transmitted to the microprocessor.

For data transmission on the RS-449 link, the microprocessor transmits the parallel data to serial link controller A, where the data is converted to serial form. The data is then transmitted serially through either AND gate 1 or 2, through RS-422 driver 11, through connector 15 to the transmission equipment.

For RS-232 data transmission (bipolar), the microprocessor transmits parallel data to serial link controller B. Serial link controller B converts the parallel data to serial form and transmits the serial data through either AND gate 5 or 6, through RS-232 driver 13, through connector (25 pin) 16 to the transmission equipment.

For RS-232 data reception by the microprocessor, data is transmitted from the transmission equipment through connector 16, through RS-232 receiver 14, through AND gate 10 to serial link controller B. Serial link controller B converts the incoming serial data to parallel and transmits the parallel data to the microprocessor. The above comprises the basic operation of a dual port serial link controller printed wiring card.

Figure 2:
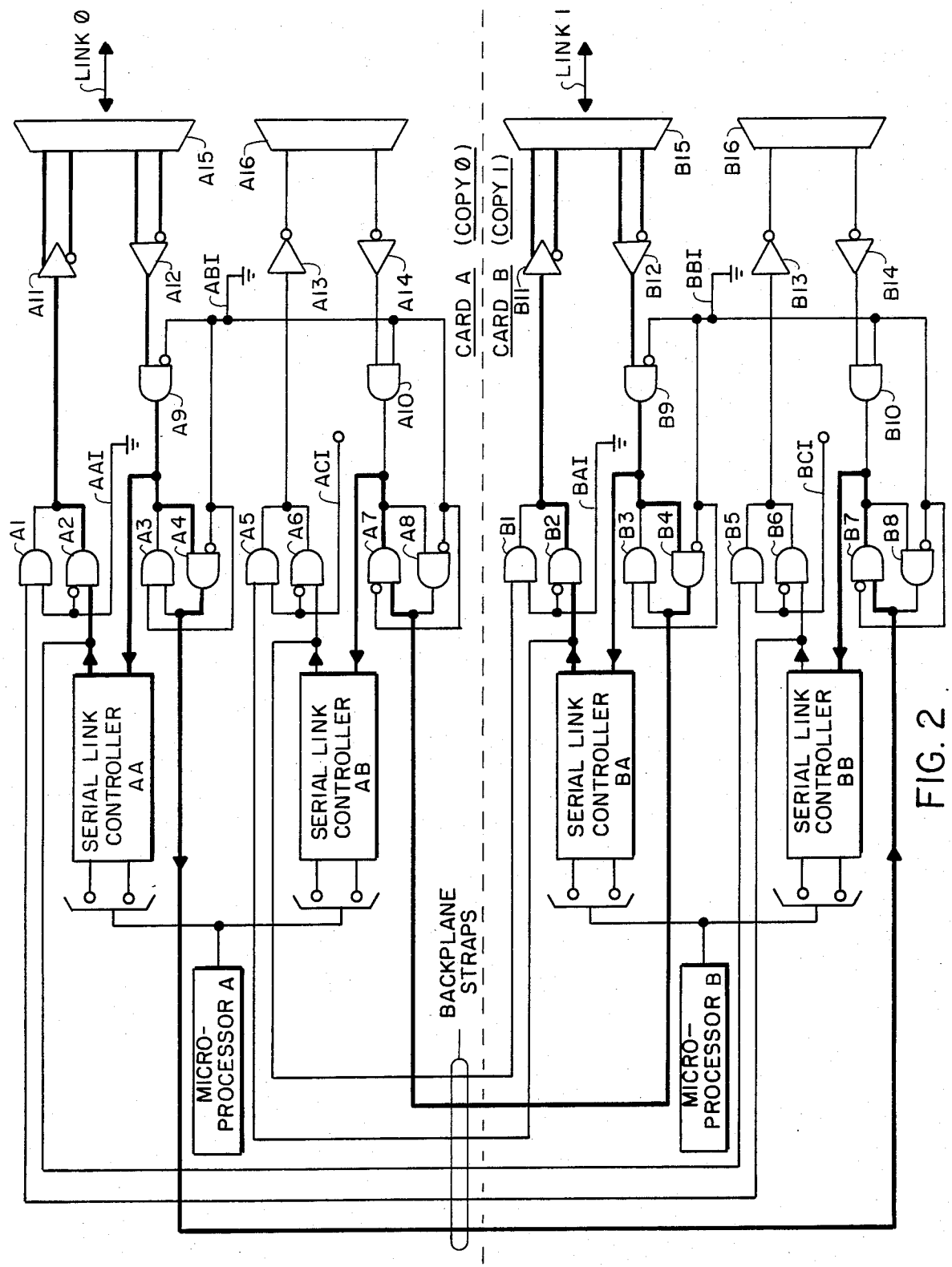
FIG. 2 is a schematic diagram of duplex dual ported serial link controller cards interconnected for RS-449 interface.
Figure 3:
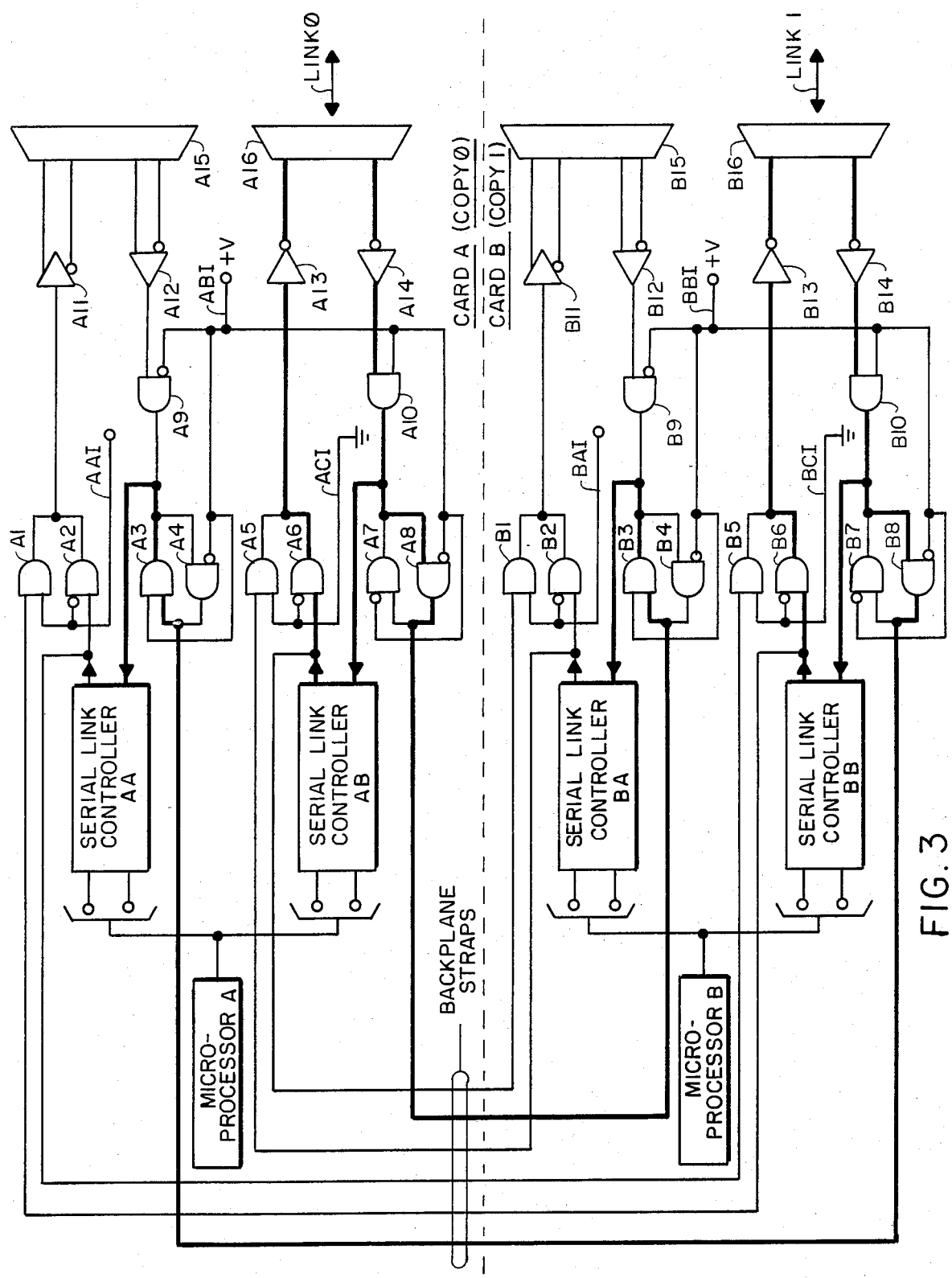
FIG. 3 is a schematic diagram of duplex dual ported serial link controller cards interconnected for RS-232 interface.

With reference to FIGS. 2 through 4, the dark lines depict the data paths for implementing duplex data transmission links with a minimal amount of printed wiring cards. These printed wiring cards are flexible for configuring either duplex RS-232 interfaces or duplex RS-449 interfaces.

In FIG. 2, the connections (and backplane straps) for duplex RS-449 interfaces are shown, along with two physical printed wiring cards, card A and card B or copy 0 and copy 1, respectively. The first copy of the duplex data link, link 0, is connected to the transmission equipment via connector A15 and the other link of the duplex pair, link 1, is connected to the transmission equipment via connector B15. The object of this configuration is to have microprocessors A and B transmit and receive the same data as a duplex pair. Printed wiring cards A and B are connected via six backplane straps as shown. On card A, control points AAI and ABI are connected to ground, logic 0. Control point ACI is unconnected. On card B, control points BAI and BBI are connected to logic 0. Control point BCI is unconnected.

Each microprocessor controls the transmission of data to the RS-449 transmission equipment. Microprocessor A transmits parallel data to serial link controller AA, where it is converted to serial form and transmitted through AND gate A2 (since the other input to AND gate A2 is at logic 1), through driver A11, through connector A15 and to the transmission equipment connected to link 0. Similarly, microprocessor B transmits parallel data to serial link controller BA where the parallel data is converted to serial data. This data is then transmitted through gate B2 to (since the other input to AND gate B2 is at logic 1), through driver B11, through connector 15 and to the transmission equipment connected to link 1. Therefore, link 0 and link 1 have transmitted the same data via the transmission equipments. AND gates A1 and B1 are blocked from transmitting because they are connected to logic 0.

For duplex data reception, data entering link 0 is transmitted through receiver A12, through AND gate A9 (since the other input to gate A9 is at logic 1), to serial link controller AA. This incoming data is converted from serial to parallel form by serial link controller AA and transmitted to microprocessor A. In addition, the incoming data is also transmitted from AND gate A9, through AND gate A4 (since the other input to AND gate A4 is at logic 1), via the backplane strap shown through AND gate B7 (since the other input to AND gate B7 is at logic 1), to serial link controller BB. The data is then converted from serial to parallel and transmitted to microprocessor B. AND gates A3 and B8 are prevented from transmitting since they are reversed to the flow of data.

For data reception from the transmission equipment on link 1, the data is transmitted through connector B15, through receiver B12, through AND gate B9 (since the other input to gate B9 is at logic 1), to serial link controller BA. The data is converted from serial to parallel by controller BA and transmitted to microprocessor B. In addition, the data received from link 1 is transmitted from gate B9 through AND gate B4 (since the other input to gate B4 is at logic 1), via the backplane strap shown through AND gate A7 (since the other input to AND gate A7 is at logic 1), to the serial link controller AB. Controller AB converts data from serial to parallel and transmits the parallel data to microprocessor A. With limited backplane strapping, connection of the transmission equipment to the proper connector and grounding of the appropriate control points, flexible data link controllers may be implemented with only two physical printed wiring cards and no change in backplane wiring.

FIG. 3 depicts the connection of the two printed wiring cards for duplex serial link controllers for an RS-232 application. The RS-232 transmission equipments are connected via link 0 to connector A16 and via link 1 to connector B16. Microprocessor A transmits parallel data to serial link controller AB where it is converted to serial form and transmitted through AND gate A6, through driver A13, through connector A16 to the link 0 transmission equipment. Similarly, microprocessor B transmits parallel data to serial link controller BB where the data is converted to serial form and transmitted through AND gate B6, through driver B13, through connector B16 to the link 1 transmission equipment. The data transmitted by microprocessors A and B is the same since data received on link 0 is transmitted through connector A16, through receiver A14, through AND gate A10 to serial link controller AB where it is converted to parallel and transmitted to microprocessor A. Similarly, data received on link 1 from the transmission equipment is transmitted through connector B16, through receiver B14, through AND gate B10 to serial link controller BB where it is converted to parallel and transmitted to microprocessor B.

Data received on link 0 is also transmitted from AND gate A10 through AND gate A8, via the backplane strap shown to AND gate B3, to serial link controller BA. Similarly, the data received on link 1 is transmitted from AND gate B10 through AND gate B8, via the backplane strap shown through AND gate A3, to serial link controller AA. AND gates A4, A7, B4 and B7 are prohibited from transmitting any data because they are reversed to the flow of the data. Serial link controllers AB and BB are now active in a duplex configuration. Serial link controllers AA and BA are in the ready standby mode.

Next, the fault tolerant capability of this duplex arrangement will be shown. FIG. 4 is an example of duplex RS-449 data transmission and reception as was shown in FIG. 2. Unlike FIG. 2, however, FIG. 4 depicts the occurrence of a fault in serial link controller AA. For this condition, microprocessor A removes serial link controller AA from service. This requires that another data transmission path be found for transmitting data via link 0. For this case where serial link controller AA is faulty, microprocessor A removes the logic 0 connection from control point AAI and places a logic 1 on control point AAI. As a result, AND gate A1 is enabled.

For duplex transmission of data via links 0 and 1, microprocessor B transmits the data to both links. Microprocessor B transmits parallel data to serial link controller BA which converts this data to serial form and transmits it through gate B2, through driver B11, through connector B15 to link one transmission equipment, as was shown in FIG. 2. Since serial link controller AA is faulty, microprocessor A does not transmit its data via link 0. Instead, microprocessor B performs the data transmission via link 0. Microprocessor B transmits parallel data to serial link controller BB where the data is converted to serial form. The data is then transmitted from serial link controller BB via the backplane strap shown, through AND gate A1 (which was previously enabled), through RS-422 driver A11, through connector A15 to the link 0 transmission equipment. Duplex data transmission has been maintained despite the loss of serial link controller AA due to a single fault.

A similar situation obtains, if serial link controller BA was faulty. Although not shown in dark lines in FIG. 4, serial link controller AB would transmit the serial data via its upper right lead, via the backplane strap to AND gate B1. The control point BAI would be at logic 1 and, thereby enable AND gate B1. As a result, the data would be transmitted through AND gate B1, through RS-422 driver B11, through connector B15, to link 1 the transmission equipment. As previously shown in FIG. 2, the transmission to link 0 would be handled as described in FIG. 2 from microprocessor A, to serial link controller AA, through gate A2 (which is enabled due to control point AAI being at logic 0), through driver A11, through connector A15 to the link 0 transmission equipment. Therefore, as shown above, by manipulating the control points of the duplex copies (card A and card B), a single fault in any link controller or microprocessor will not inhibit duplex data transmission and reception.

Control points ABI and BBI control the function of each card. That is, a logic 0 on these control leads selects the RS-449 mode, while a logic 1 on these leads selects the RS-232 mode of data transmission. Control points AAI, ACI, BAI and BCI control the routing of data between the two cards for the occurrence of various fault conditions as mentioned above. These control points are typically manipulated under the control of reconfiguration software of each processor.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a data transmission system, a multiple port serial link controller arrangement connected to first and second copies of transmission equipment, said serial link controller arrangement comprising:
   first printed wiring card means including:
       first link interface means connected to said first copy of said transmission equipment, said first link interface means being operated to transmit and receive data of a first type transmitted between said first copy transmission equipment and said serial link controller arrangement;
       first switching means connected to said first link interface means and being operated to selectively control said transmission and reception of said first type of data between said first link interface means and said serial link controller arrangement;

first controller means connected to said first switching means and being operated to transmit and receive said first type of data from said first switching means and being operated to convert said first type of data to parallel data;

first processor means connected to said first controller means and being operated to receive, to transmit and to store said parallel data; and first duplex controller means connected to said first processor means and being operated to receive said parallel data;

second printed wiring card means including:

second link interface means connected to said second copy of said transmission equipment, said second link interface means being operated to transmit and receive data of said first type transmitted between said second copy transmission equipment and said serial link controller arrangement;

second switching means connected to said second link interface means and being operated to selectively control said transmission and reception of said first type of data between said second link interface means and said serial link controller arrangement;

second controller means connected to said second switching means and being operated to transmit and receive said first type of data from said second switching means and being operated to convert said first type of data to parallel data;

second processor means connected to said second controller means and being operated to receive, to transmit and to store said parallel data; and second duplex controller means connected to said second processor means and being operated to receive said parallel data;

said serial link controller arrangement further including:

first strapping means connected between said first switching means and said second switching means, said first strapping means being operated to transmit said first type of data from said first switching means, through said second switching means to said second duplex controller means;

said second duplex controller means being operated in response to said first type of data from said first copy of said transmission equipment to convert said first type of data to said parallel data and to transmit said parallel data to said first processor means;

second strapping means connected between said first switching means and said second switching means, said second strapping means being operated to transmit said first type of data from said second switching means, through said first switching means to said first duplex controller means; and said first duplex controller means being operated in response to said first type of data from said second copy of said transmission equipment to convert said first type of data to said parallel data and to transmit said parallel data to said second processor means.

2. A multiple port serial link controller arrangement as claimed in claim 1, said first link interface means including:

first connector means connected to said first copy of said transmission equipment and being operated to connect said first copy of said transmission equipment to said first printed wiring card means;

first driver means connected between said first switching means and said first connector means, said first driver means being operated to produce said first type of data suitable for transmission to said transmission equipment; and first receiver means connected between said first connector means and said first switching means, said first receiver means being operated to transmit said suitable first type of data from said first copy of said transmission equipment to said first switching means.

3. A multiple port serial link controller arrangement as claimed in claim 2, said first switching means including:

first gating means connected between said first controller means and said first driver means, said first gating means being operable to transmit said first type of data from said first controller means to said first driver means;

first control means connected to said first gating means and to a source of logic 0; and said first gating means being operated in response to said first control means.

4. A multiple port serial link controller arrangement as claimed in claim 3, said first switching means further including:

second gating means connected between said first controller means and said first receiver means, said second gating means being operable to transmit said first type of data from said first receiver means to said first controller means;

second control means connected to said second gating means and to said source of logic 0; and said second gating means being operated in response to said second control means.

5. A multiple port serial link controller arrangement as claimed in claim 4, wherein said second control means further includes a connection from said second gating means to said source of logic 0, said second gating means being operated to transmit said first type of data through said first strapping means to said second switching means.

6. A multiple port serial link controller arrangement as claimed in claim 5, said first controller means including serial link controller means.

7. A multiple port serial link controller arrangement as claimed in claim 6, said first duplex controller means including serial link controller means.

8. A multiple port serial link controller arrangement as claimed in claim 7, said first processor means including microprocessor means.

9. A multiple port serial link controller arrangement as claimed in claim 8, said first type of data including RS-449 compatible data.

10. A multiple port serial link controller arrangement as claimed in claim 9, said second link interface means including:

second connector means connected to said second copy of said transmission equipment and being operated to connect said second copy of transmission equipment to said second printed wiring card means;

second driver means connected between said second switching means and said second connector means, said second driver means being operated to produce said first type of data suitable for transmission to said transmission equipment; and second receiver means connected between said second controller means and said second connector means, said second receiver means being operated to transmit said suitable data of said first type from said second copy of said transmission equipment to said second switching means.

11. A multiple port serial link controller arrangement as claimed in claim 10, said second switching means including:

third gating means connected between said second controller means and said second driver means, said third gating means being operable to transmit said first type of data from said second controller means to said second driver means;

third control means connected to said third gating means and to said source of logic 0; and said third gating means being operated in response to said third control means.

12. A multiple port serial link controller arrangement as claimed in claim 11, said second switching means further including:

fourth gating means connected between said second receiver means and said second controller means, said fourth gating means being operable to transmit said data of said first type from said second receiver means to said second controller means;

fourth control means connected to said fourth gating means and to said source of logic 0; and said fourth gating means being operated in response to said fourth control means.

13. A multiple port serial link controller arrangement as claimed in claim 12, wherein said fourth control means includes a connection from said fourth gating means to said source of logic 0, said fourth gating means being operated to transmit said first type of data through said second strapping means to said first switching means.

14. A multiple port serial link controller arrangement as claimed in claim 13, said second controller means including serial link controller means.

15. A multiple port serial link controller arrangement as claimed in claim 14, said second duplex controller means including serial link controller means.

16. A multiple port serial link controller arrangement as claimed in claim 15, said second processor means including microprocessor means.

17. A multiple port serial link controller arrangement as claimed in claim 16, said first type of data including RS-232 compatible data.

18. A multiple port serial link controller arrangement as claimed in claim 17, said first control means including an open circuit connection.

19. A multiple port serial link controller arrangement as claimed in claim 18, said second control means including a connection between said second gating means and a source of logic 1.

20. A multiple port serial link controller arrangement as claimed in claim 19, wherein there is further included fifth control means connected between said first switching means and a source of logic 0.

21. A multiple port serial link controller arrangement as claimed in claim 20, said third control means including an open circuit connection.

22. A multiple port serial link controller arrangement as claimed in claim 21, said fourth control means including a connection between said fourth gating means and said source of logic 1.

23. A multiple port serial link controller arrangement as claimed in claim 22, wherein there is further included sixth control means connected between said second switching means and said source of logic 0.

* * * * *